United States Patent [19]

Lanniel et al.

[11] Patent Number: 5,102,575
[45] Date of Patent: Apr. 7, 1992

[54] STABILIZATION OF $H_2O_2$ BLEACHING AND BLEACHING/DESIZING BATHS

[75] Inventors: Genevieve Lanniel, Munich, Fed. Rep. of Germany; Jean-Claude Bouchenak, Courbon, France

[73] Assignee: Atochem, Puteaux, France

[21] Appl. No.: 365,434

[22] Filed: Jun. 13, 1989

[30] Foreign Application Priority Data

Jun. 13, 1988 [FR] France .................. 88 08198

[51] Int. Cl.⁵ ........................... C01B 15/037
[52] U.S. Cl. ................ 252/186.29; 252/186.28; 252/186.25
[58] Field of Search ........... 252/186.28, 186.29, 252/186.25

[56] References Cited

U.S. PATENT DOCUMENTS

| | | | |
|---|---|---|---|
| 2,783,132 | 2/1957 | Panepinto | 252/186.29 |
| 3,860,391 | 1/1975 | Kling et al. | 252/186.29 |
| 4,239,643 | 12/1980 | Kowalski | 252/186.29 |
| 4,294,575 | 10/1981 | Kowalski | 252/186.29 |
| 4,347,149 | 8/1982 | Smith et al. | 252/186.29 |
| 4,510,068 | 4/1985 | Rohlfs et al. | 252/186.29 |
| 4,614,646 | 9/1986 | Christiansen | 252/186.29 |
| 4,753,750 | 6/1988 | Ouhadi et al. | 252/95 |
| 4,791,013 | 12/1988 | Koboshi et al. | 222/94 |
| 4,812,173 | 3/1989 | Tsao et al. | 252/186.29 |

FOREIGN PATENT DOCUMENTS 0009839 4/1980 European Pat. Off. ....... 252/186.29

OTHER PUBLICATIONS

Hydrogen Peroxide, by Schumb et al., *ACS*, Reinhold Publishing Corp, p. 578.
Ullmann's Encyclopedia of Industrial Chemistry, 5th ed. vol. 4, p. 194.

*Primary Examiner*—Richard D. Lovering
*Assistant Examiner*—Joseph D. Anthony
*Attorney, Agent, or Firm*—Burns, Doane, Swecker & Mathis

[57] ABSTRACT

Storage-stable compositions adopted for the stabilization of hydrogen peroxide in aqueous alkaline media, e.g., bleaching or bleaching/desizing baths, include water and particular amounts of (i) an alkali metal hexametaphosphate, (ii) an alkali metal salt of diethylenetriaminepentamethylenephosphonic acid, (iii) potassium carbonate, $K_2CO_3$, and (iv) sodium carbonate, $Na_2CO_3$, with (iii) and (iv) characteristically being present in a total amount of about 300 g/l.

11 Claims, No Drawings

STABILIZATION OF H₂O₂ BLEACHING AND BLEACHING/DESIZING BATHS

BACKGROUND OF THE INVENTION

1. Field of the Invention

The present invention relates to the stabilization of hydrogen peroxide in an aqueous alkaline medium, and, more especially, to such stabilization by incorporating a particular composition into an $H_2O_2$ bleaching bath for materials based on cellulose fibers, for example a bleaching or simultaneous bleaching/desizing bath for the treatment of textile or tissue substrates.

By the term "desizing" is intended a treatment for the degrading of starch by means of an enzyme of the amylase type, or a preparation based on such an enzyme.

By "bleaching" is intended a treatment with hydrogen peroxide, $H_2O_2$.

2. Description of the Prior Art

The stabilization of $H_2O_2$ in relation to bleaching or simultaneous bleaching/desizing in an aqueous alkaline medium is well known to this art. Compare, for example, U.S. Pat. No. 4,294,575.

Bleaching by means of $H_2O_2$ in an alkaline medium, whether carried out individually or simultaneously with desizing, is also well known to this art. See, for example, the French patents published under Nos. 2,497,244, 2,543,181 and 2,545,854, the above '575 U.S. patent, and the Japanese patent published under No. 57-39,280.

And U.S. Pat. No. 4,239,643 describes an anhydrous or essentially anhydrous composition to increase the stability of $H_2O_2$ in an alkaline bleaching bath, including a combination of an alkali metal polyphosphate and an alkali metal salt of diethylenetriaminepentamethylenephosphonic acid of the formula:

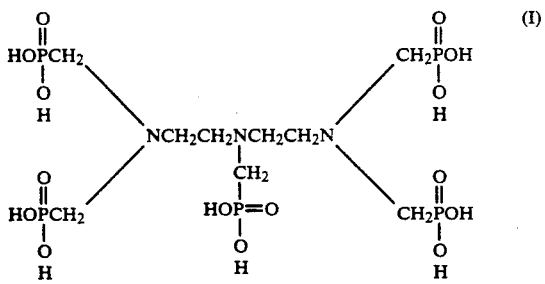

for example, a combination of sodium hexametaphosphate and a sodium salt of the acid (I). The composition described has the advantage of being compatible with non-starch sizing agents, based for example on polyvinyl alcohol or on carboxymethylcellulose, which may be combined with those of the starch type. It also presents the added advantage of enabling bleaching in the absence of sodium silicate.

On the other hand, it has disadvantages related to its anhydrous or quasi-anhydrous character, which, if not observed, renders it unsuitable for its intended use. Therefore, it is necessary to protect it against the risk of dilution by or exposure to water, both in storage and during transportation, and against the difficulties inherent in the storage or transfer of solid materials, such as, for example, the formation of lumps and the aggregation of these materials.

SUMMARY OF THE INVENTION

Accordingly, a major object of the present invention is the provision of an improved $H_2O_2$ stabilizing composition which conspicuously avoids, or at least markedly ameliorates, those disadvantages and drawbacks to date characterizing the state of this art.

Briefly, the present invention features a novel composition for the stabilization of hydrogen peroxide, $H_2O_2$, in aqueous alkaline media, which novel composition comprises an alkali metal hexametaphosphate and alkali metal salt of diethylenetriaminepentamethylenephosphonic acid, said novel composition being in the form of an aqueous liquid and further comprising, per liter and in addition to the water, 100 g to 300 g potassium carbonate, $K_2CO_3$, and 0 to 200 g sodium carbonate, $Na_2CO_3$, with the provisos that the sum of the amounts of $K_2CO_3$ and of $Na_2CO_3$ are essentially equal to 300 g, the amount of alkali metal hexametaphosphate ranges from 50 to 150 g, and the amount of the alkali metal salt of diethylenetriaminepentamethylenephosphonic acid is such that the amount of active diethylenetriaminepentamethylenephosphonic acid ranges from 15 g to 50 g.

DETAILED DESCRIPTION OF THE PREFERRED EMBODIMENTS OF THE INVENTION

More particularly according to the present invention, by the "amount of active diethylenetriaminepentamethylenephosphonic acid" is intended that amount of diethylenetriaminepentamethylenephosphonic acid corresponding to the amount of sodium hydroxide necessary to pass from one point of inflection to the other on the pH curve obtained by the titrimetry, using sodium hydroxide, of an aqueous solution of the alkali metal salt of such acid, adjusted prior to titration to a pH of approximately 2 by means of hydrochloric acid.

The alkali metal hexametaphosphate most typically used is sodium hexametaphosphate.

The alkali metal salt of diethylenetriaminepentamethylenephosphonic acid most typically used is a sodium salt, such as, for example, the heptasodium salt of such acid. The latter is marketed commercially, for example in the form of an aqueous solution such as DEQUEST ®, reference 2066, by the Monsanto Co., containing 25% active acid.

A preferred composition according to the invention contains, per liter and in addition to the water, approximately 150 g $Na_2CO_3$, 150 g $K_2CO_3$, 100 g sodium hexametaphosphate and an amount of the heptasodium salt of diethylenetriaminepentamethylenephosphonic acid such that the amount of active diethylenetriaminepentamethylenephosphonic acid is equal to 25 g. This particular formulation is hereinafter designated as composition (A).

The compositions according to the invention are stable and do not display any significant evolution or change after prolonged storage, both relative to appearance and chemical effect.

The crystallization temperature of the compositions of the invention is sufficiently low such that no problems are encountered in storage.

The aqueous media which the compositions of the invention well stabilize vis-a-vis the $H_2O_2$ content thereof, essentially comprise, as indicated above, bleaching baths for cellulose fiber materials or conjoint bleaching/desizing baths for textile or tissue substrates.

The amount of composition of the invention used for such purpose in a known bleaching or simultaneous bleaching/desizing bath is such as to establish a pH of the bath which advantageously does not exceed 11 and preferably ranges from 9 to 11. Thus, an amount of stabilizing composition ranging from about 10 cm$^3$ to about 50 cm$^3$ is typically used per liter of bath.

For example, approximately 25 cm$^3$ to 35 cm$^3$ of composition (A) are advantageously used per liter of bath.

In order to further illustrate the present invention and the advantages thereof, the following specific examples are given, it being understood that same are intended only as illustrative and in nowise limitative. In said examples to follow, the stability of the compositions of the invention was measured over time; the aqueous alkaline media used for testing simulated $H_2O_2$ bleaching, or bleaching/desizing baths for textile materials based on cellulose fibers.

EXAMPLE 1

A composition (A) according to the invention contained, per liter and in addition to the water, 150 g $Na_2CO_3$, 150 g $K_2CO_3$, 100 g sodium hexametaphosphate and 25 g active diethylenetriaminepentamethylenephosphonic acid (corresponding to the use of 100 g DELQUEST ®2066 to form 1 liter of (A)).

Composition (A) was stored at a temperature of approximately 20° to 25° C.

Over the course of storage, the stabilizing capacity of (A) relative to $H_2O_2$ was evaluated as follows: a solution (L) was prepared; it contained, in water and per liter, 30 cm$^3$ of composition (A), 2 cm$^3$ of a surface active agent, SYNPERONIC 91-5 ® marketed by ICI, 2 ppm of ferric ion $Fe^{3+}$ (ferric nitrate), 28.3 g of 100% $H_2O_2$. The speed of the disappearance of $H_2O_2$ in (L) at 95° C. was observed as a function of time, over 2 hours. It was the same when determined on the day of formulation of (A) or after (A) had been stored for 6 months. Said speed was 6.2 g $H_2O_2$ per hour on average, per liter of (L).

The presence of 5 g per liter in (L), of TERMAMIL L60 ® an amylase preparation marketed by NOVO Co., did not change this determination.

EXAMPLE 2

The variation in pH caused by the addition of 4 N $H_2SO_4$ to the solution (L) of Example 1 which contained 5 g TERMAMIL L60 ® per liter, was observed for the duration of the storage of composition (A). This variation was the same when determined on the day of the formulation of (A) or after (A) had been stored for 6 months.

It was very small and equal to approximately 0.2 pH units per 5 cm$^3$ of 4 N $H_2SO_4$ added, or 0.5 pH units per 8 cm$^3$ of said added acid.

The above determination was valid whether (L) contained, per liter, 8 g sodium silicate expressed by weight of a 36° Be solution (density 1.33) or whether it contained no silicate.

The compositions of the invention thus produce a pronounced buffering of the bath, which buffering does not change over time.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising a formulation, in an aqueous medium, of (i) an alkali metal hexametaphosphate, an (ii) an alkali metal salt of diethylenetriaminepentamethylenephosphonic acid, (iii) potassium carbonate, $K_2CO_3$, and, optionally, (iv) sodium carbonate, $Na_2CO_3$, wherein the total amount of potassium carbonate, $K_2CO_3$, and, optionally, sodium carbonate, $Na_2CO_3$, is sufficient to enhance the storage stability of said composition.

2. The composition of matter as defined by claim 1, comprising 50 to 150 g/l of (i), an amount of (ii) such as to provide from 15 to 50 g/l of active diethylenetriaminepentamethylenephosphonic acid, 100 to 300 g/l of (iii), and 0 to 200 g/l of (iv).

3. The composition of matter as defined by claim 2, comprising an amount of (iv) up to 200 g/l.

4. The composition of matter as defined by claim 3, wherein the total amount of (iii) and (iv) is essentially 300 g/l.

5. The composition of matter as defined by claim 3, wherein (i) comprises sodium hexamethaphosphate.

6. The composition of matter as defined by claim 4, comprising about 100 g/l of (i), an amount of (ii) such as to provide about 25 g/l of active acid, about 150 g/l of (iii), and about 150 g/l of (iv).

7. The composition of matter as defined by claim 5, wherein (ii) comprises a sodium salt of diethylenetriaminepentamethylenephosphonic acid.

8. The composition of matter as defined by claim 7, wherein (ii) comprises a heptasodium salt.

9. In an aqueous alkaline bleaching or bleaching/desizing bath containing a hydrogen peroxide bleaching agent, the improvement which comprises, as an $H_2O_2$-stabilizer therefore, an effective amount to stabilize hydrogen peroxide of the composition of matter as defined by claim 6.

10. In an aqueous alkaline bleaching or bleaching/desizing bath containing a hydrogen peroxide bleaching agent, the improvement which comprises, as an $H_2O_2$-stabilizer therefore, an effective amount to stabilize hydrogen peroxide of the composition of matter as defined by claim 3.

11. In an aqueous alkaline bleaching or bleaching/desizing bath containing a hydrogen peroxide bleaching agent, the improvement which comprises, as an $H_2O_2$-stabilizer therefore, an effective amount to stabilize hydrogen peroxide of the composition of matter as defined by claim 4.

* * * * *